United States Patent

[11] 3,612,399

[72] Inventors Barry Mansfield Rodgers
Mansfield;
James A. Petrie, Littleover; Michael John Talbot Smith, Newart, all of England
[21] Appl. No. 882,457
[22] Filed Dec. 5, 1969
[45] Patented Oct. 12, 1971
[73] Assignee Rolls-Royce Limited
Derby, England
[32] Priority Apr. 5, 1967
[33] Great Britain
[31] 15601/67
Continuation-in-part of application Ser. No. 716,906, Mar. 28, 1968, now abandoned.

[54] VARIABLE DIRECTIONALLY SILENCED NOZZLE
8 Claims, 7 Drawing Figs.
[52] U.S. Cl. .................................................. 239/265.19,
239/265.27, 239/265.33, 239/265.37, 181/33.222
[51] Int. Cl. ....................................................... B63h 11/10

[50] Field of Search............................................239/265.19,
265.35, 265.37, 265.33, 265.31, 265.29, 265.41,
265.43; 181/33.222

[56] References Cited
UNITED STATES PATENTS
2,726,509  12/1955  Gist et al......................  239/265.39
2,943,444   7/1960  Baxter..........................  239/265.31 X
2,955,418  10/1960  David et al....................181/33.222 UX
3,484,847  12/1969  Poole ...........................  239/265.31 X
3,532,275  10/1970  Hom et al. ....................  239/265.33

*Primary Examiner*—Richard A. Schacher
*Assistant Examiner*—Reinhold W. Thieme
*Attorney*—Cushman, Darby & Cushman

ABSTRACT: A nozzle assembly for a gas turbine engine intended to effect noise reduction when the aircraft carrying the nozzle is landing or taking off. The nozzle is variable between a cruise configuration in which it has a section which is circular or of regular polygonal form and a noise reduction configuration in which the nozzle dimension in one direction is substantially greater than that in a perpendicular direction. A pair of clamshell doors effect the change in configuration for the nozzle.

PATENTED OCT 12 1971

INVENTORS
BARRY RODGERS
JAMES ALEXANDER PETRIE
MICHAEL JOHN TALBOT SMITH

BY Cushman, Darby & Cushman
ATTORNEYS

INVENTORS
BARRY RODGERS
JAMES ALEXANDER PETRIE
MICHAEL JOHN TALBOT SMITH

BY Cushman, Darby & Cushman
ATTORNEYS

NOISE MARKED ▨ BLANKETS NOISE MARKED ▨ FROM THE GROUND

INVENTORS
BARRY RODGERS
JAMES ALEXANDER PETRIE
MICHAEL JOHN TALBOT SMITH

BY Cushman, Darby & Cushman
ATTORNEYS

VARIABLE DIRECTIONALLY SILENCED NOZZLE

RELATED APPLICATIONS

This application is a continuation-in-part of our copending application Ser. No. 716,906, filed March 28, 1968, now abandoned.

BACKGROUND AND BRIEF DESCRIPTION OF INVENTION

The present invention relates to a nozzle for a gas turbine jet propulsion engine and is more particularly related to jet pipe and nozzle constructions for reducing noise from such engines.

It is desirable during operation of an aircraft using gas turbine jet propulsion engines over populated areas to silence the jet nozzle of the engine as far as possible with a minimum loss of propulsive efficiency.

According to one aspect of the present invention, there is provided a nozzle assembly for a gas turbine engine comprising a variable area nozzle and actuation means adapted to effect variation of the area of said nozzle between a first configuration in which the exit area of said nozzle substantially comprises a regular polygon or circle and a second configuration in which said exit area comprises a figure whose dimension in one direction is substantially greater than that in a direction perpendicular to said one direction. By changing the configuration of the nozzle, the width of the path of downwardly directed noise can be considerably reduced, and engines will appear quieter to persons standing below the flight path of the aircraft.

In one preferred embodiment, the exit area of the nozzle in the first configuration is square and the two vertical sides of the nozzle are pivotable at the upstream ends thereof, so that the downstream ends thereof are movable towards and away from the axis of the jet pipe to form an area which in the second configuration is rectangular, the longest sides of the rectangle being vertical. Preferably, the nozzle includes a pair of clamshell doors which define the vertical sidewalls of the nozzle. The clamshell doors are arranged to be driven axially along the axis of a jet pipe as they are being pivoted to change the configuration of the nozzle. A novel screwjack-driving means is used to effect simultaneous axial and pivotal movements of the doors.

Means may be provided to provide flow reversal of gases from the nozzle.

Preferably, said nozzle is so mounted in an aircraft that in said second configuration the direction of least noise emission from said nozzle is directed substantially downwards when the aircraft is in level flight.

The invention will now be particularly described, merely by way of example, with reference to the accompanying drawings described below.

DETAILED DESCRIPTION OF INVENTION

Figure 1:
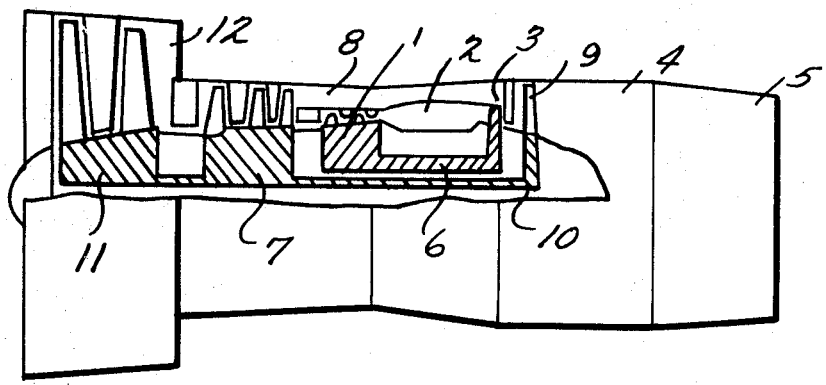
FIG. 1 schematically illustrates a typical gas turbine engine having a jet pipe and nozzle construction according to the present invention.

Referring to FIG. 1, there is shown a bypass gas turbine jet propulsion engine having HP (high pressure) compressor means 1, combustion equipment 2, HP (high pressure) turbine means 3, a jet pipe 4 and final nozzle 5 all in flow series. The compressor 1 is drivingly connected to the turbine means 3 by a shaft 6.

A LP (low pressure) compressor 7 is provided for that part of the airflow which passes through the HP compressor, and the remaining part of said airflow passes through a bypass duct 8 which bypasses the combustion equipment 2. The gases flowing through the HP turbine also pass through a LP turbine 9 downstream of the HP turbine and then pass to atmosphere through the jet pipe 4 and final nozzle 5, the LP compressor being drivingly connected to the LP turbine by means of a shaft 10. The bypass stream in the duct 8 is mixed with the exhaust gases in the jet pipe 4 upstream of the final nozzle 5. A fan 11 is disposed in a fan duct 12 upstream of the LP compressor, and is driven from the LP turbine.

In accordance with this invention, specific means are provided for changing the cross-sectional configuration of a nozzle 5 relative to a jet pipe 4. Typically, the jet pipe 4 has a circular cross section. The nozzle 5 may have a cross section which is either circular or of a regular polygon, however, the configuration of the nozzle is adjustable so that the engine can be appreciably silenced during travel over populated areas. In the context of this specification, the nozzle 5 will be described with reference to first and second configurations. The first configuration is that used during normal cruising flight of an aircraft in which the engine is mounted, and the second configuration is used when it is desired to reduce noise from the engine. The second configuration has a reduced width and area, as compared to the first configuration, and this has the effect of reducing the width of a path of noise directly below the aircraft. The second configuration for the nozzle is substantially rectangular, with the longer sides being vertical in the normal operating attitude of the engine, thereby producing a nozzle area of smaller width. This results in a reduction in downwardly directed noise level in the second configuration of the engine. Also, by reducing the nozzle area during the landing approach run of the aircraft, the pressure rise on the downstream side of the turbine causes the fan to slow down, and this reduces the total noise produced by the fan.

Figure 2:
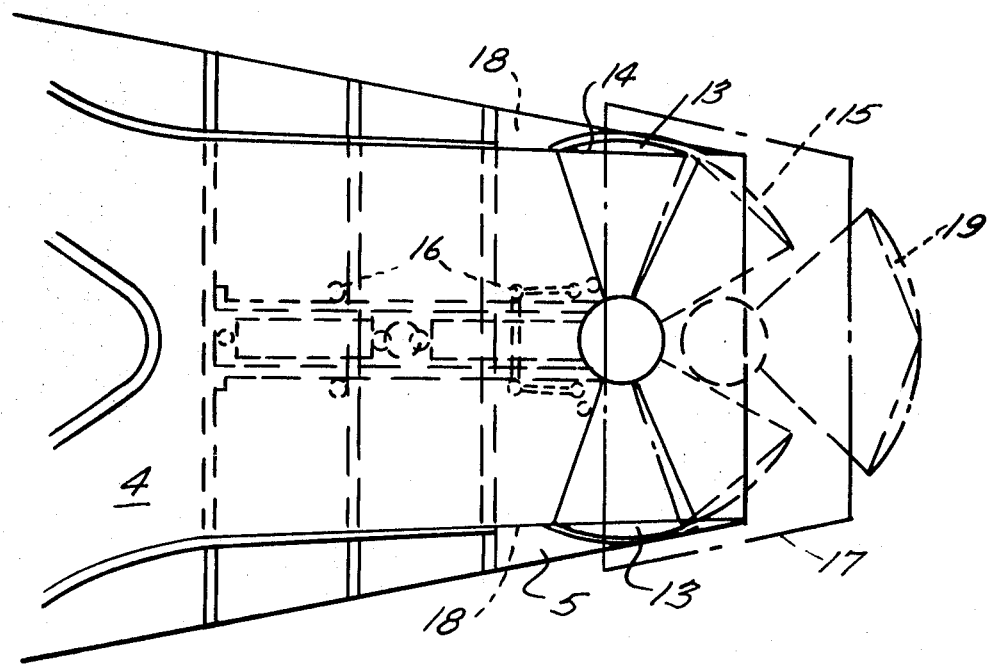
FIG. 2 is a top plan view of the jet pipe and nozzle construction utilizing a pair of clamshell doors for changing cross-sectional configuration of the nozzle.

Referring to FIG. 2, a jet pipe 4 is provided with a nozzle 5 on the downstream end thereof. A pair of clamshell doors 13 are provided which, in a first configuration of the nozzle, lie in recesses 14 in the nozzle wall, and in a second configuration the clamshell doors are pivoted to a position shown by the dotted lines 15 in which the nozzle area and the width of the nozzle are reduced, thereby providing directional silencing of the nozzle.

In the FIG. 2 embodiment, the nozzle 5 is axially movable in rollers 16 to the position shown by the dotted lines 17 thereby uncovering apertures 18 in the jet pipe wall for thrust spoiling. Simultaneously with such axial movement of the nozzle the clamshell doors 13 are pivoted to the position shown by the lines 19 whereby the greater part of the area of the nozzle is closed off. The nozzle area in the first configuration is circular and in the second configuration 15 a substantially rectangular nozzle of small (relative to the circle diameter) width is produced. The apertures 18 in the jet pipe wall may be provided with vanes for deflecting the exhaust gases forwardly of the aircraft for braking.

Figure 3:
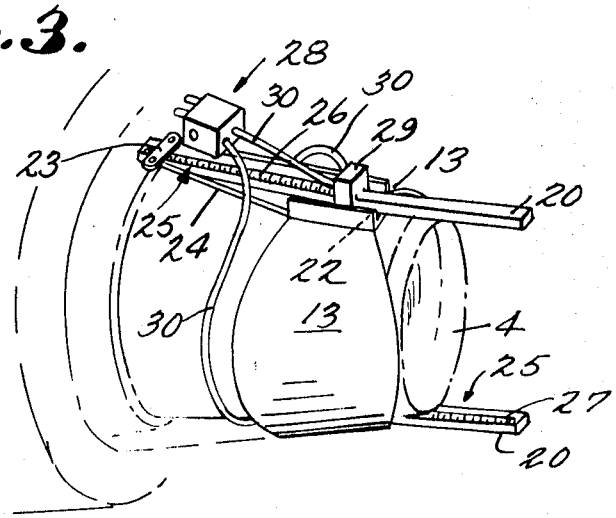
FIG. 3 is a perspective view of a pair of clamshell doors, and actuating means therefor, in normal thrust configuration relative to a jet pipe.
Figure 4:
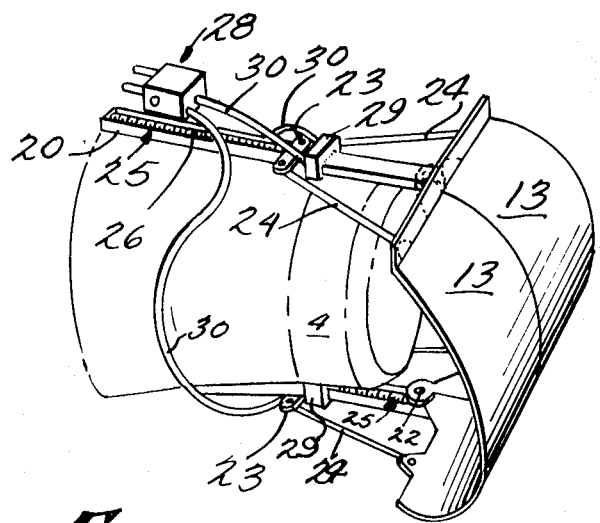
FIG. 4 is a perspective view, similar to the view of FIG. 3, but showing the clamshell doors in a spoiled thrust configuration relative to a jet pipe.

FIGS. 3 and 4 illustrate a preferred actuating means for clamshell doors in accordance with the present invention. Portions of the nozzle casing have been omitted from these figures so that the operation of clamshell doors 13 can be more clearly understood. In the illustrated arrangement, the clamshell doors are moved axially simultaneously with their pivotal movement which changes the area and shape of the nozzle assembly with which they are associated. Axial movement permits the clamshell doors to clear the downstream extremity of the jet pipe 4 as the doors pivot towards closed positions relative to each other.

FIG. 3 shows the clamshell doors in stowed positions on each side of a jet pipe 4 for a normal thrust configuration of the engine nozzle, and FIG. 4 shows the doors in a spoiled thrust configuration. In addition, the doors can be moved to partially closed positions, intermediate the positions of FIGS. 3 and 4, for changing the nozzle configuration to reduce noise.

The pair of clamshell doors 13 are supported and guided by upper and lower tracks 20 which are secured to the tailpipe assembly in fixed positions relative to the jet pipe 4. As more clearly shown in FIGS. 4 and 5, the clamshell doors are pinned to blocks 21 which are mounted for sliding movements in the tracks 20. Thus, each track 20 carries a sliding block 21, and the sliding blocks function to support and guide the clamshell doors. The doors are pinned into, or otherwise fastened, to their respective sliding blocks by pin means 22 so that the doors can pivot relative to the sliding blocks.

In addition to the sliding block arrangement discussed above, the doors are also secured to the upper and lower tracks 20 by upper and lower yoke means 23. The yoke means 23 function to assist in the support of the doors and to guide movements of the doors through linking members 24. Thus, axial movement of the yoke means 23 relative to the upper and lower tracks 20 will cause the doors 13 to swing about the pivotal axes defined by pin means 22. On the other hand, axial movement of the sliding blocks 21 relative to the tracks 20 will axially displace the pivotal axes of the doors 13 so that the doors will clear the end of the jet pipe 4 as they are being swung about their pivotal axes by the yoke means 23 and the linking members 24. The pivotal axes defined by the two pin means 22 lie on a common vertical axis for pivoting the pair of doors.

Figure 5:
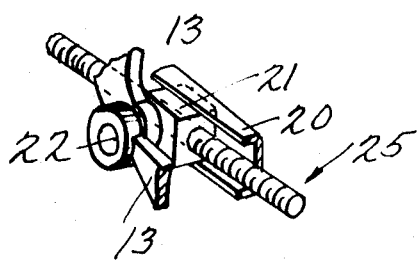
FIG. 5 is a detailed perspective view of a portion of an actuating means associated with the clamshell doors of FIGS. 3 and 4.

Movements of the sliding blocks 21 and of the yoke means 23 are accomplished by a novel screwjack arrangement, as shown in FIGS. 3-5. Each track 20 carries a compound screwjack 25 which functions to translate turning motions of the screwjack into axial movements of the sliding blocks and yokes. As shown in FIG. 5, a threaded portion of the screwjack is received into a threaded bore of a sliding block (and the same arrangement is provided for the yoke means 23) so that the block will be moved along the track 20 as the screwjack is rotated. In accordance with this invention, the compound screwjacks 25 have two separate pitches in their threaded portions. An upstream portion 26 of both the upper and lower screwjacks have identical pitches which are less coarse than the identical pitches provided on downstream portions 27 of each screwjack. With this arrangement, an actuation of the screwjacks causes the yoke means and the sliding blocks to be moved along their respective threaded portions 26 and 27, and axial movement of the yoke means will take place at a slower rate than axial movement of the sliding blocks. Thus, a compound movement is provided which has the effect of moving the pair of doors 13 into a downstream position which clears the end of a jet pipe while the doors are being pivoted toward each other to change the configuration of the nozzle or to spoil the thrust from the jet pipe. The axial movement of the doors to clear the end of the jet pipe takes place at a more rapid rate than the pivotal movement of the doors towards each other. Reverse rotation of the screwjacks causes a reverse compound movement of the doors back to the stowed positions of FIG. 3.

Means for rotating the screwjacks 25 are shown in FIGS. 3 and 4. Preferably an air motor 28 is utilized to effect rotation of each screwjack 25. The air motor 28 is of a well-known construction and of the type which receives compressed air from the jet engine compressor. The compressed air is passed through a turbine device within the air motor and rotation of the turbine is imparted to the screwjack by suitable gearing connections. A stepdown gearbox 29 may be fitted between the output shaft of the turbine device and the screwjack itself.

In the illustrated arrangement, a single air motor can function as a prime mover for two separate gearboxes 29. Flexible drive cables 30 interconnect the single air motor with upper and lower gearboxes 29 and the two gearboxes transmit dive to their respective screwjacks when the air motor is actuated.

Figure 6:
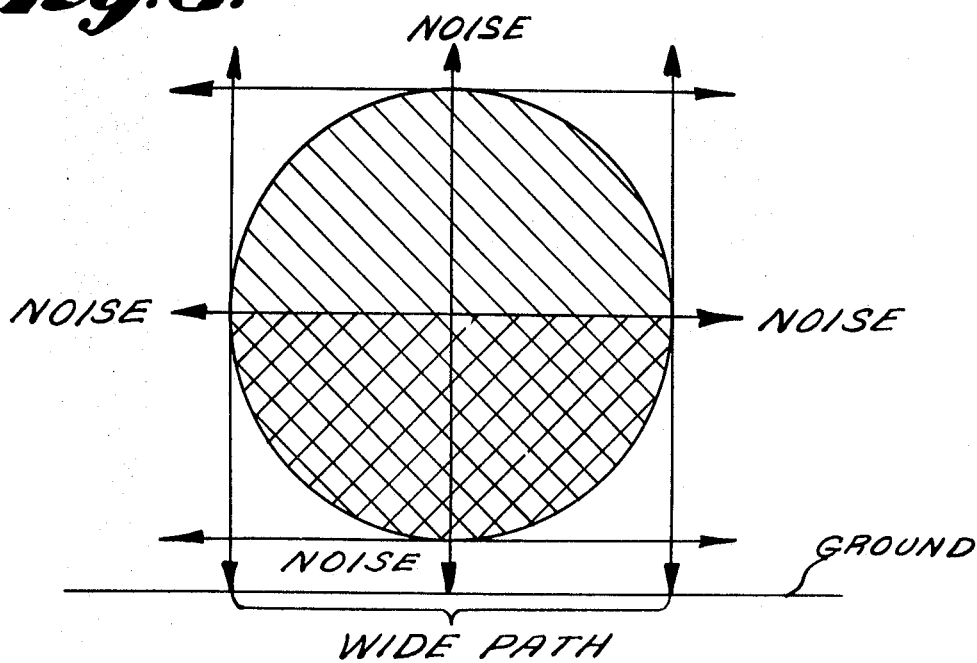
FIG. 6 is a graphic illustration of noise distribution from a typical jet pipe and nozzle in normal thrust configuration.
Figure 7:
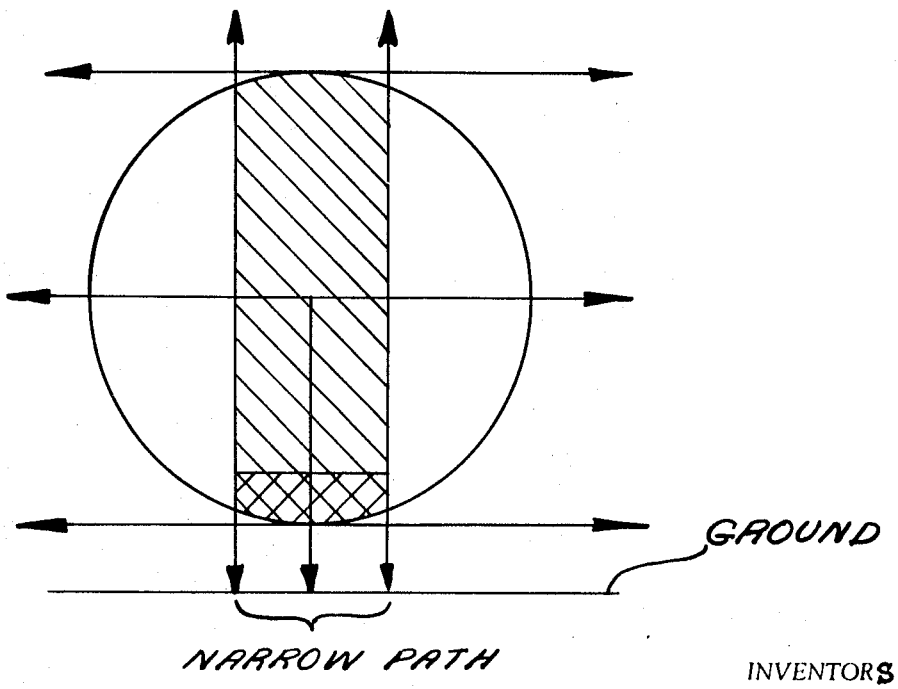
FIG. 7 is a graphic illustration of the effect that a change in nozzle configuration has on noise distribution.

FIGS. 6 and 7 graphically illustrate the type of noise reduction accomplished by the present invention. FIG. 6 represents a typical circular configuration for an engine nozzle for normal cruising, and noise is illustrated as emanating in all directions from the nozzle. The path of noise on the ground is shown as being approximately equal to the diameter of the nozzle. This illustration represents a first configuration for a nozzle as defined in the context of this specification.

FIG. 7 illustrates a change in nozzle configuration to reduce downwardly directed noise, and it can be seen that a much narrower path of noise is observed on the ground. The second configuration represented by this figure shows a typical nozzle configuration having relatively long vertical sides as compared to its horizontal width. Although it is apparent that noise emanates from such engines in all directions, it is of particular concern to reduce the effective noise to observers on the ground, and the FIG. 7 configuration gives a much quieter effect for an aircraft passing overhead than what would be observed with the FIG. 6 configuration.

What is claimed is:

1. In a nozzle assembly for a gas turbine engine having a pair of clamshell doors for changing the cross-sectional configuration of the nozzle, the improvement comprising means for supporting and guiding the pair of clamshell doors so that pivotal closing movements of the doors towards each other will reduce the width of the nozzle opening, when viewed in normal operational attitude of the engine, and thereby providing for directional silencing of the engine, and actuating means for simultaneously moving said pair of doors axially in a downstream direction relative to a jet pipe portion of said engine while said doors are also moving towards each other about pivot points having a common vertical axis, said actuating means comprising screwjack means for translating rotational movements of a screw into axial and pivotal movements of the doors, said screwjack means including two threaded portions of different pitch so that said doors will be moved axially at a faster rate than they will be pivoted relative to each other.

2. The improvement of claim 1 wherein said means for supporting and guiding the pair of clamshell doors includes a pair of track means to which said doors are slideably connected.

3. The improvement of claim 2 wherein said doors are supported in said track means by sliding blocks which are secured to portions of the doors.

4. The improvement of claim 1 wherein track means are provided for supporting and guiding said pair of doors, and wherein said screwjack means are carried in said track means for imparting axial and pivotal movements to said doors.

5. The improvement of claim 4 wherein the pivot points for said doors are defined by pins which secure said doors into sliding blocks mounted within said track means, and wherein said screwjack means are operatively connected to said sliding blocks to axially displace the sliding blocks when the screwjack means are rotated.

6. The improvement of claim 4 wherein said clamshell doors are pivoted by axial movement of yoke means carried in said track means, said yoke means being operatively connected to the doors by linking members, and said yoke means being operatively connected to said screwjack means so that the yoke means are axially displaced when the screwjack means are rotated.

7. The improvement of claim 1 wherein said screwjack means are operated by an air motor means.

8. The improvement of claim 7 wherein two track means and two screwjack means are provided for supporting and guiding said clamshell doors, and wherein a single air motor device operates both screwjack means.